May 21, 1963    R. L. SMIRL ET AL    3,090,255
TRANSMISSION
Filed May 7, 1956
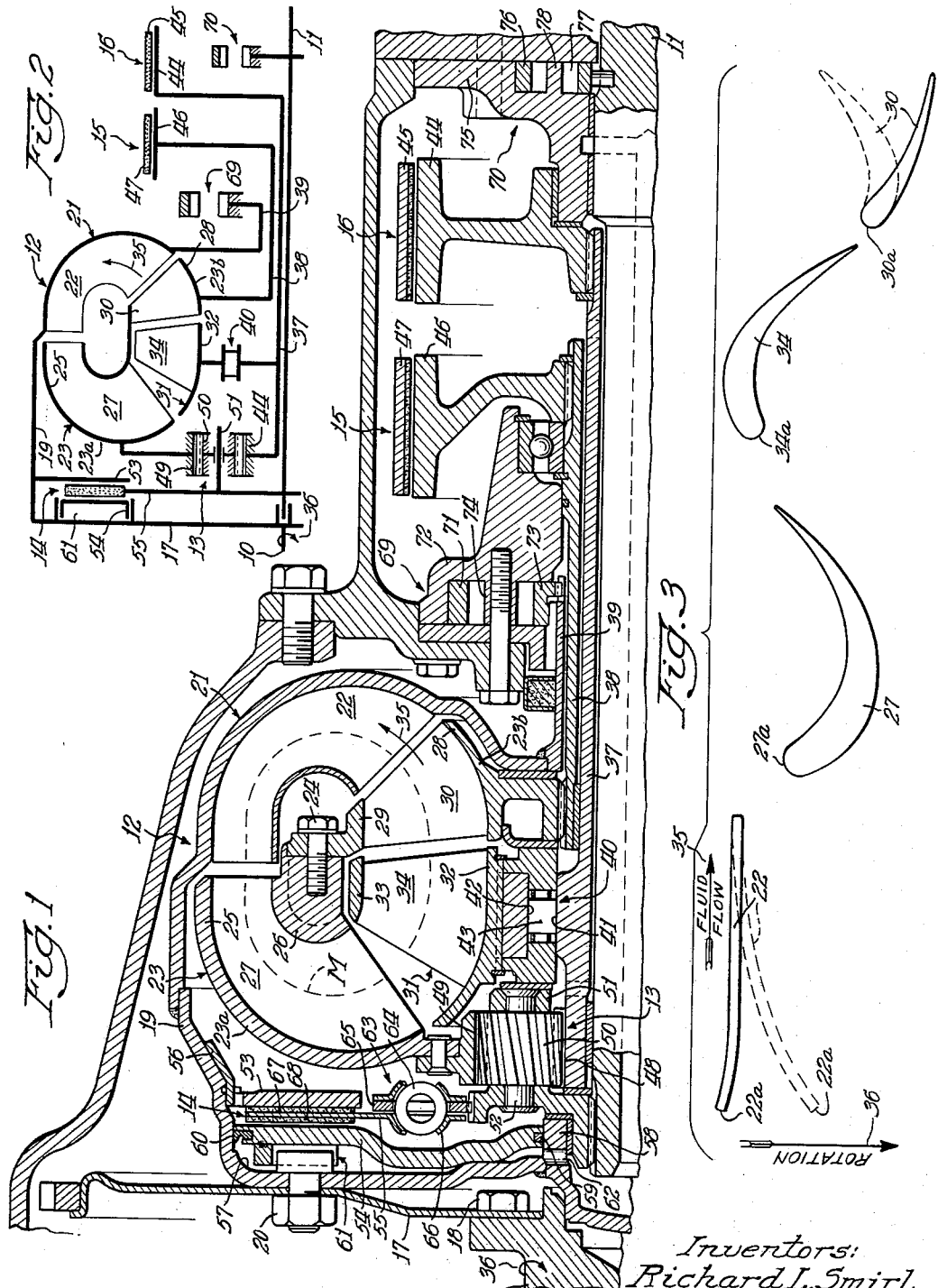
Inventors:
Richard L. Smirl
and Miczyslaw J. Waclawek
By: Keith T. Bleuer Atty.

United States Patent Office 3,090,255
Patented May 21, 1963

3,090,255
TRANSMISSION
Richard L. Smirl and Miczyslaw J. Waclawek, Chicago, Ill., assignors to Borg-Warner Corporation, Chicago, Ill., a corporation of Illinois
Filed May 7, 1956, Ser. No. 583,069
3 Claims. (Cl. 74—732)

Our invention relates to transmissions for automotive vehicles and more particularly to transmissions of this type utilizing hydrodynamic torque converters.

A transmission of this general type has been previously proposed which utilizes a planetary gear set in conjunction with a hydraulic torque converter for providing low and high speed forward drives and a reverse drive. The planetary gear set was of the duplex planet gear type, and the hydraulic torque converter was of the simple three element type. A brake was provided for the sun gear of the planet gear set and for the stator of the torque converter for completing the low speed forward drive, and a direct drive clutch was provided between the drive and driven shafts of the transmission. Reverse was obtained by braking the planet carrier of the gear set and connecting the planet carrier with the turbine of the torque converter so that the stator of the torque converter drove through the sun gear of the gearing. Such a transmission is disclosed in U.S. Patent No. 3,001,415.

It is an object of our invention to provide an improved form of transmission of this type and more specifically to utilize a simple planetary gear set in lieu of the duplex planetary gear set while still obtaining the two speeds in forward drive and the drive in reverse. In this connection, it is an object to arrange the simple planet gear set in the same fluid housing as the hydrodynamic torque converter. It is contemplated that braking means be provided for the sun gear of the planet gear set and for the stator of the torque converter so that the torque converter drives through the planet gear set to provide multiplication in both the torque converter and in the gear set for a low speed drive. It is contemplated that the ring gear of the gear set be driven by the turbine of the torque converter and that the carrier be connected to the driven shaft of the transmission for driving it.

It is also an object to provide a direct drive clutch connected with the planet gear carrier of the gear set for providing a direct drive in lieu of the low speed drive.

In connection with the low speed drive, it is a further object to arrange the torque converter with a two stage turbine, more specifically with one stage being between the impeller and the stator and the second stage connected with the first and located between the stator and the impeller. It is contemplated that the simple planet gear set will be so constructed as to produce a lower torque multiplication than the duplex type and that the torque converter of the two stage turbine type is capable of and is constructed so as to provide a higher torque conversion ratio than the simple three element type, so that the overall torque multiplication in low speed drive remains nevertheless relatively high.

Furthermore, the present two turbine stage converter has the characteristic of staying in torque multiplication to a much higher vehicle speed than is possible with a simple three element converter.

It is a further object of the invention to provide a two stage type of hydraulic torque converter of the type mentioned in connection with a simple planet gear set with the first stage of the turbine being connected to an element of the gear set and with braking mechanism being provided for the second stage of the turbine, the second turbine stage allowing the brake to be located externally of the torque converter and the brake being connected with the second turbine stage by means of a sleeve shaft.

It is a more specific object of the invention to connect the sun gear of the simple planet gear set located within the torque converter housing and the stator of the torque converter through a sleeve shaft with a brake engageable to complete the low speed drive and to connect the second turbine stage through a second sleeve shaft located externally of the first with a brake engageable for holding the turbine and ring gear of the planet gear set for completing the reverse drive.

The invention consists of the novel constructions, arrangements and devices to be hereinafter described and claimed with respect to a preferred embodiment of the invention illustrated with reference to the accompanying drawings wherein:

FIGURE 1 is a longitudinal sectional view of a transmission embodying the principles of the invention;

FIGURE 2 is a schematic illustration of the transmission shown in FIGURE 1; and

FIGURE 3 is a diagrammatic illustration of the four sets of blades of the impeller, the first stage of the turbine, the second stage of the turbine, and the stator showing the blade contours along the mean flow line.

Referring to the drawings, wherein like reference numerals in the different views designate identical parts, the transmission, in general, comprises a drive shaft 10, a driven shaft 11, a torque converter 12, a planetary gear set 13, a direct drive clutch 14, and two friction brakes 15 and 16.

The drive shaft 10 has bolted thereon a flywheel 17 by means of bolts 18. The hydraulic torque converter 12 includes a housing 19 bolted to the flywheel 17 by means of bolts 20. The torque converter 12 also includes an impeller 21, the hollow shell of which is a part of and is integral with the converter housing 19 and having spaced blades 22 fixed within the housing. The converter 12 includes also a turbine or driven element 23 having first and second bladed sections or stages 23a and 23b, respectively, secured together by means of bolts 24. The turbine stage 23a comprises an outer hollow shell 25, an inner shell 26 and spaced blades 27 fixed between the shells 25 and 26. The turbine stage 23b comprises an outer shell 28, an inner shell 29 and spaced blades 30 fixed between the shells 28 and 29. The inner shells 26 and 29 are secured together by means of the bolts 24. The torque converter includes also a stator 31 having an outer shell 32 and an inner shell 33 and spaced blades 34 fixed between the shells 32 and 33.

FIG. 3 discloses diagrammatically the blades 22, 27, 34 and 30 of the impeller 21, the first turbine stage 23a, the stator 31, and the second turbine stage 23b, respectively, the blades being shown along the mean flow line M of the converter 12. Fluid flows as indicated by the arrows 35 and the direction of rotation of the shaft 10 and of the impeller 21 and the turbine 23 is indicated by the arrows 36. The impeller blades 22 have fluid entrance ends 22a which may take the position shown in full lines in FIG. 3 wherein the fluid entrance ends extend slightly opposite to the direction of rotation indicated by the arrow 36 to the position shown in broken lines wherein the fluid entrance ends 22a extend in the same direction as the direction of rotation indicated by the arrow 36. The turbine blades 27 are thicker at their fluid entrance ends 27a and extend in the same direction as the direction of rotation indicated by the arrow 36 for about half their length and then curve in the opposite direction for the remainder of their length. The stator blades 34 are thicker at their fluid entrance ends 34a and the exit portions of the blades extend in general in the same direction as the arrow 36. The turbine blades 30 are thicker at their fluid entrance ends 30a and may extend as shown in full lines in FIG. 3 in the same direction as the arrow 36 to the position shown in broken lines wherein the blades 30 extend in a direction opposite to the direction of rotation indicated by the arrow 36.

Three sleeve shafts 37, 38, and 39 are disposed over the shaft 11. A one-way brake 40 is disposed between the shaft 37 and the stator 31. The one-way brake may be of any suitable construction and in the illustrated embodiment comprises an inner cylindrical race 41, an outer cylindrical race 42 and a plurality of tiltable grippers 43 between the races 41 and 42.

The brake 16 is effective on the shaft 37 and comprises a brake drum 44 and a brake band 45 engageable on the outer periphery of the drum. The brake band 45 may be brought into engagement with the brake drum 44 by any suitable servo motor (not shown).

The brake 15 is effective on the shaft 38 and is similar in construction to the brake 16. The brake 15 comprises a drum 46 and a brake band 47 engageable on the outer periphery of the drum. Any suitable servo motor (not shown) may be used in connection with the brake band 47 for engaging it on the brake drum 46. The shaft 38 is splined to the second stage 23b of the turbine 23 so that the brake 15 is effective for braking the turbine.

The planetary gear set 13 comprises a sun gear 48 formed integrally on the shaft 37, a ring gear 49 connected with the first stage 23a of the turbine 23, a plurality of planet gears 50 in mesh with the sun and ring gears and a carrier 51 for the planet gears 50. The carrier 51 comprises a plurality of stub shafts 52 on each of which is rotatably disposed one of the planet gears 50. The carrier 51 is splined to the driven shaft 11.

The direct drive clutch 14 comprises an axially stationary pressure plate 53, an annular piston 54 and a friction disc 55 disposed between the plate 53 and the piston 54. The pressure plate 53 is fixed within the housing 19 by means of an annular plate 56 which is fixed as by welding to the housing 19. An annular cavity 57 is formed within the housing 19 and is defined at its center by means of an inwardly extending hub 58, and the piston 54 is slidably disposed within the cavity 57. Sealing rings 59 and 60 are provided in the inner and outer edges of the piston 54 for sealing it with respect to the sides of the cavity 57. The chamber 57 is formed between the piston 54 and the adjacent end of the housing 19. While the piston 54 can move axially with respect to the housing 19, it is held against rotation relative thereto by a pin and slot connection 61. The hub 58 is provided with an opening 62 therethrough for supplying fluid under pressure to the chamber 61.

The clutch disc 55 is connected by means of a vibration dampener 63 with the planet gear carrier 51. The dampener 63 comprises a plurality of springs 64 disposed in coinciding windows provided in a center hub 65 fixed to the planet gear carrier 51, in the clutch disc 55 on one side of the hub 65, and in an annular plate 66 on the other side. The friction disc 55 is provided with friction facings 67 and 68 which are adapted to respectively make friction contact with the stationary disc 53 and the movable piston 54.

The transmission is provided with fluid pumps 69 and 70 for supplying fluid pressure to the chamber 57 of the direct drive clutch 14 and to the servo motors (not shown) of the friction brakes 15 and 16 for actuating the clutch and brakes for providing different speed ratios for the transmission. The pump 69 is driven by the shaft 39 and comprises an outer gear 71 rotatably disposed within a casing 72 and an inner gear 73 in mesh with the outer gear 71 at one point and separated from the outer gear at another point by a crescent shaped casing portion 74.

The fluid pump 70 is similar in construction and operation to the pump 69 and comprises a casing 75, an outer gear 76, an inner gear 77 and a crescent shaped casing portion 78. The gear 77 is fixed on the shaft 11 so as to be driven thereby.

The illustrated transmission provides low and high forward speed drives and a drive in reverse. The low speed forward drive is completed by engaging the brake 16 by applying the band 45 to the drum 44. The brake 16 functions to hold the sun gear 48 against rotation and, through the shaft 37 and the one-way device 40, functions to hold the stator 31 against reverse rotation, that is, rotation in a direction reverse to that indicated by the arrow 36. The drive in low speed forward is from the drive shaft 10 through the fly wheel 17, the converter housing 19, the impeller 21, the two turbine stages, 23a and 23b, of the turbine 23, the ring gear 49, the planet gears 50, and the carrier 51 to the driven shaft 11.

The impeller 21 is connected through the torque converter housing 19 with the drive shaft 10 and impels the fluid within the impeller and within the remainder of a torus formed by the shells 25, 32 and 28 in the direction indicated by the arrow 35. The fluid flowing out of the impeller 21 at the outermost ends of the blades 22 impinges on the blades 27 of the first turbine stage 23a and tends to move the turbine 23 in the forward direction, that is, in the direction indicated by the arrow 36. The fluid flowing between the turbine blades 27 is re-directed in the reverse direction due to the curvature of the blades 27 into the blades 34 of the stator 31. The stator 31 is initially held stationary by means of the friction brake 16 acting through the shaft 37 and the one-way engaging device 40, and the stator blades 34 re-direct the fluid so that it again flows in the forward direction, that is, in the direction indicated by the arrows 36. The fluid flowing out of the stator blades 34 flows into the turbine blades 30 of the second turbine stage 23b, and additional energy is imparted to the blades 30 tending to augment the energy imparted to the turbine blades 27. The fluid flows out of the turbine blades 30 back into the impeller 21. The stator 31 takes the torque reaction of the torque converter 12 so that the torque converter multiplies torque, that is, provides a torque on the turbine 23 which is increased with respect to that provided on the drive shaft 10. The existence of the second stage turbine 23b in addition to the first turbine stage 23a assures that a higher torque multiplication is obtained than if only a single stage turbine is utilized, and this increased torque is particularly useful in connection with the specific type of planetary gear set 13 employed as will be hereinafter described more fully.

When the turbine 23 reaches a predetermined speed, the fluid flowing out of the turbine blades 27, instead of impinging on the concave sides of the stator blades 34 impinges on the back sides of these blades tending to move the stator in the forward direction. The one-way device 40 at this time releases, the tiltable sprags 43 tilting slightly and permitting the race 42 to run freely of the race 41 so that the stator 31 at this time rotates freely in the forward direction. At this time, the torque converter 12 functions as a simple fluid coupling and no increase in torque takes place through the converter. It will be understood, as is well-known in connection with torque converters of the general type disclosed, the torque conversion provided by the torque converter 12 decreases gradually from the maximum under stall conditions until the so-called clutch point is reached at which the stator 31 begins to rotate in the forward direction.

The torque imparted to the turbine 23 by the fluid within the torque converter 12 is impressed on the ring gear 49, and the planetary gear set 13 further multiplies the torque impressed on the driven shaft 11. The sun gear 48 of the gear set 13 functions as the reaction element of the gear set, and the reaction is taken by the brake 16 through the shaft 37. While the hydraulic torque converter 12 is converting torque, the torque impressed on the driven shaft 11 is thus the product of the torque multiplication produced by the torque converter 12 and the gear set 13. When the torque converter functions as a simple fluid coupling, the torque multiplication is obviously that only produced by the gear set 13. The torque converter 12 at stall may produce, for example, a torque multiplication of 2.65 and the gearing 13 may produce a multiplication of 1.53. The multiplication produced by the gearing 13 having only single planet gears 50 between sun and ring gears 48 and 49 can be made less than is possible to be obtained by a duplex planetary gear set having sets of two planet gears between sun and ring gears, but since the torque multiplication produced by the illustrated type of torque converter having two turbine stages is higher than that produced by a torque converter having one turbine stage, the overall torque multiplication produced by the two stage turbine type of torque converter functioning in connection with the relatively low torque multiplying gearing, nevertheless, produces a high overall torque multiplication.

High speed forward drive, which is a direct drive, is provided by engaging the clutch 14 and disengaging the brake 16. The drive in this condition of the transmission is from the drive shaft 10 through the flywheel 17, the converter housing 19, the clutch 14 including the spring dampener 63, and the carrier 51 to the driven shaft 11. As will be apparent, the clutch 14 is engaged simply by applying fluid pressure to the passage 62 into the chamber 57 so that the piston 54 is moved to the right as seen in FIG. 1 to grip the clutch disc 55 between the piston and the pressure plate 53.

Reverse drive is completed by engaging the brake 15 by applying the brake band 47 on the drum 46, while maintaining the clutch 14 and the brake 16 disengaged. The brake 15 functions to hold the shaft 38 and the stages 23a and 23b of the turbine 23 stationary, and, since the ring gear 49 is connected to the stage 23a of the turbine, the ring gear 29 is held stationary. With the stages 23a and 23b of the turbine stationary and with the impeller 21 being driven in the forward direction from the shaft 10 and the flywheel 17, the reaction of the stator 31 is in the reverse direction and the stator rotates in this direction. Such rotation is transmitted through the one-way engaging device 40, which now functions as a one-way clutch, the shaft 37, the sun gear 48, the planet gears 50, and the carrier 51 to the driven shaft 11. During this drive, the ring gear 49 of the gear set 13 is stationary and functions as the reaction element of the gear set, and the gear set 13 having its sun gear 48 driven from the stator 31 multiplies the torque transmitted from the stator to the driven shaft 11.

Braking the vehicle by means of the vehicle engine is, of course, possible in either low speed forward drive or high speed forward drive with the brake 16 or the clutch 14 engaged since both of these drives are two-way drives. An augmented engine braking effect for the vehicle can be produced by a simultaneous engagement of the clutch 14 and the brake 15. The clutch 14, when engaged, couples directly the drive shaft 10 and the driven shaft 11. A simultaneous engagement of the brake 15 holds the stages 23a and 23b of the turbine stationary. The turbine, when stationary, functions to retard the rotation of the impeller 21 through the fluid of the torque converter 12 and thus of the drive shaft 10 connected thereto, and this prevents the increase in speed which would otherwise be obtained when the driven shaft 11 tends to increase in speed. The driven shaft 11 is also correspondingly held from increased speed since the shaft 11 is connected to the shaft 10 at this time by the clutch 14.

From the foregoing description it can be seen that there has been provided an improved transmission which utilizes a simple planetary gear set in conjunction with a torque converter having a two stage turbine, and that this particular combination of torque multiplying elements gives practically the same torque multiplication in low speed drive as a transmission having a duplex planetary gear set in combination with a torque converter having a one stage turbine.

While we have described our invention in connection with one specific embodiment thereof, it is to be understood that this is by way of illustration and not by way of limitation and the scope of our invention is defined solely by the appended claims which should be construed as broadly as the prior art will permit.

We claim:

1. In a transmission, the combination of a drive shaft, a driven shaft, a hydraulic torque converter including a housing and having an impeller driven by said drive shaft and a turbine and a stator, a planetary gear set in said torque converter housing and having a sun gear and a ring gear and a plurality of planet gears each of which is in mesh with said sun gear and said ring gear and a planet gear carrier for said planet gears, a shaft rigidly connected with said sun gear and extending out of said converter housing, a one-way engaging device between said sun gear shaft and said stator, said ring gear being connected directly to said turbine to be driven thereby, said planet gear carrier being connected to said driven shaft, and brake means for said sun gear shaft disposed outside of said converter housing for completing a low speed power train between said drive and driven shafts.

2. In a transmission, the combination of a drive shaft, a driven shaft, a hydraulic torque converter including a housing and having an impeller driven by said drive shaft and a turbine having first and second stages and a stator, a planetary gear set in said torque converter housing and having a sun gear and a ring gear and a plurality of planet gears each of which is in mesh with said sun gear and said ring gear and a planet gear carrier for said planet gears, a shaft connected with said sun gear and extending out of said converter housing, a one-way engaging device between said sun gear shaft and said stator, said ring gear being connected directly to one of the stages of said turbine to be driven thereby, said planet gear carrier being connected to said driven shaft, and brake means for said sun gear shaft disposed outside of said converter housing for completing a low speed power train between said drive and driven shafts.

3. In a transmission, the combination of a drive shaft, a driven shaft, a hydraulic torque converter including a torque converter housing and having an impeller driven by said drive shaft and a turbine and a stator, a planetary gear set in said torque converter housing and having a sun gear element and a ring gear element and a plurality of planet gears each of which is in mesh with said sun and said ring gear elements and a planet gear carrier element, a sleeve shaft connected with one of said elements and extending out of said converter housing, one of said elements being connected directly to said turbine to be driven thereby, another of said elements being connected to said driven shaft, brake means for said stator and brake means for the third one of said elements disposed outside said housing and operable upon said sleeve shaft for completing a low speed power train between said drive and driven shafts, a clutch in said converter housing, adapted to connect said drive shaft directly to said driven shaft so that a high speed power train is completed upon application of said clutch.

References Cited in the file of this patent

UNITED STATES PATENTS

| | | |
|---|---|---|
| 2,152,113 | Van Lammeren | Mar. 28, 1939 |
| 2,578,450 | Pollard | Dec. 11, 1951 |
| 2,679,768 | Baule | June 1, 1954 |
| 2,762,237 | Kelbel | Sept. 11, 1956 |
| 2,782,659 | Kelley | Feb. 26, 1957 |
| 2,803,974 | Kelley | Aug. 27, 1957 |
| 2,815,684 | Roche | Dec. 10, 1957 |
| 2,851,906 | De Lorean | Sept. 16, 1958 |